Aug. 12, 1924.

M. P. KING 1,504,956

SHOCKER ATTACHMENT FOR BINDERS

Filed Nov. 8, 1921       7 Sheets-Sheet 1

Fig. 1.

Inventor
Myron P. King
By Oring & Hague
Attys.

Aug. 12, 1924.  
M. P. KING  
SHOCKER ATTACHMENT FOR BINDERS  
Filed Nov. 8, 1921  
1,504,956  
7 Sheets-Sheet 7

Inventor  
Myron P. King

Patented Aug. 12, 1924.

1,504,956

UNITED STATES PATENT OFFICE.

MYRON P. KING, OF BLOCKTON, IOWA.

SHOCKER ATTACHMENT FOR BINDERS.

Application filed November 8, 1921. Serial No. 513,830.

*To all whom it may concern:*

Be it known that I, MYRON P. KING, a citizen of the United States, and resident of Blockton, in the county of Taylor and State of Iowa, have invented a certain new and useful Shocker Attachment for Binders, of which the following is a specification.

This invention relates to improvements in machines for shocking small grain.

The object of my invention is to provide a machine in the nature of an attachment which may be secured to the ordinary grain binder in such a way as to receive the bundles of grain delivered therefrom, and to arrange them in the shape of a shock and place a band of string around the said shock, and thence deliver them to the ground surface in an upright position.

A further object is to provide in a grain shocking machine, which is designed to receive bundles of grain from the binder and to shock and deliver the said shocks to the ground surface, means whereby an extra bundle may be delivered to the ground surface adjacent to the shock each time that a shock is delivered to the ground, the bundle being for the purpose of providing a cap for the shock.

A further object is to provide a shocker attachment for binders in which is provided prime moving mechanism for driving the various devices of the shocking machine, the various mechanisms of the shocker being controlled and set into operative relation with the prime mover by the bundles as they are delivered from the binder.

A further object is to provide a shocking machine having a shock forming member capable of receiving the bundles from the binder and forming the shock while the bundles are in a horizontal position, and then being rotated to a position whereby the bundle will set vertically and thence deliver the shock to the ground surface in such a manner that the butts of the bundles may be moved rearwardly at a speed substantially equal to the speed in which the shocker is advanced over the ground surface.

These and other objects will be apparent to those skilled in the art.

My invention consists in the construction, arrangement and combination of the various parts of the device, whereby the objects contemplated are attained, as hereinafter more fully set forth, pointed out in my claims, and illustrated in the accompanying drawings, in which:

The numeral 10 indicates the delivering portion of a grain binder which is supported on a frame 11 and provided with a delivery chute 12. Only a portion of the binder mechanism is shown on the frame 11, the chute 12 being shown for the purpose of showing the manner in which my improved device receives bundles from the said binder.

The frame 11 is provided with the usual tongue device 13 which is supported on a tongue truck 14, the said truck being provided with a tongue 15, the lever mechanism for tilting the binder relative to the member 13 being not shown as this forms no part of my present invention.

My improved device comprises a main frame 16 which is provided with transversely arranged bars 17 at its front end, and with longitudinally arranged bars 18, 19 and 20, the bars 18 and 19 being connected to both of the bars 17 and spaced apart in such a manner that substantially a U-shaped frame is formed. The member 19 is provided with a bar 21, which has one end bolted in position by means of bolts 22, and the other end pivotally connected to a bracket 23 in the forward end of the member 13. The member 20 is provided with a pivoted bracket 24 in which is pivotally mounted a brace member 25, one end of which is connected to the member 21 by means of a bolt 26. A link 27 has one end pivotally mounted in the member 24, and the opposite end pivotally mounted in a bracket 28 secured to the rear end of the member 13.

By this arrangement, it will be seen that I have provided means whereby the frame 16 may be easily and quickly attached to or detached from the binder by removing the pivot members from the brackets 23 and 28.

The frame 16 is supported on wheels 29, substantially midway between its forward and rear ends so that the frame will be substantially balanced. The bar 21 serves to prevent the frame from tilting on the axis of the wheels 29.

One of the wheels 29 is secured to the frame member 18, while the opposite one is secured between the members 19 and 20, the members 19 and 20 being considerably longer than the member 18. The said members 19 and 20 are of such a length that their rear ends are substantially equal to the end of the binder member 10, as clearly shown in Figure 3.

Pivotally mounted to and between the members 18 and 19 at a point even with the rear end of the member 18, I have provided what I shall term a shock former. This former comprises a frame formed of a substantially U-shaped member 30, the end portions of which are parallel to each other, and its loop portion 31 of a slightly less width than the end members and offset to occupy a plane in front of the plane of the members 30, shown in Figure 1. One of the ends 30 is pivotally connected to the rear end of the member 18, while the opposite member 30 is pivotally connected to the central portion of the member 19 by means of pivots 32.

Each of the offset portions between the members 30 and 31 is provided with a horizontally arranged bar 33. Another horizontally arranged member 34 is provided, the forward end of which is connected to an arch member 51 mounted between the members 31, as clearly shown in Figure 5.

The members 33 and 34 have at their rear ends a circular frame member 35. This forms a frame in which my shock forming mechanism is mounted and is capable of swinging from a horizontal position, as shown in Figure 1, to a vertical position, as shown in Figure 2.

Figure 1:
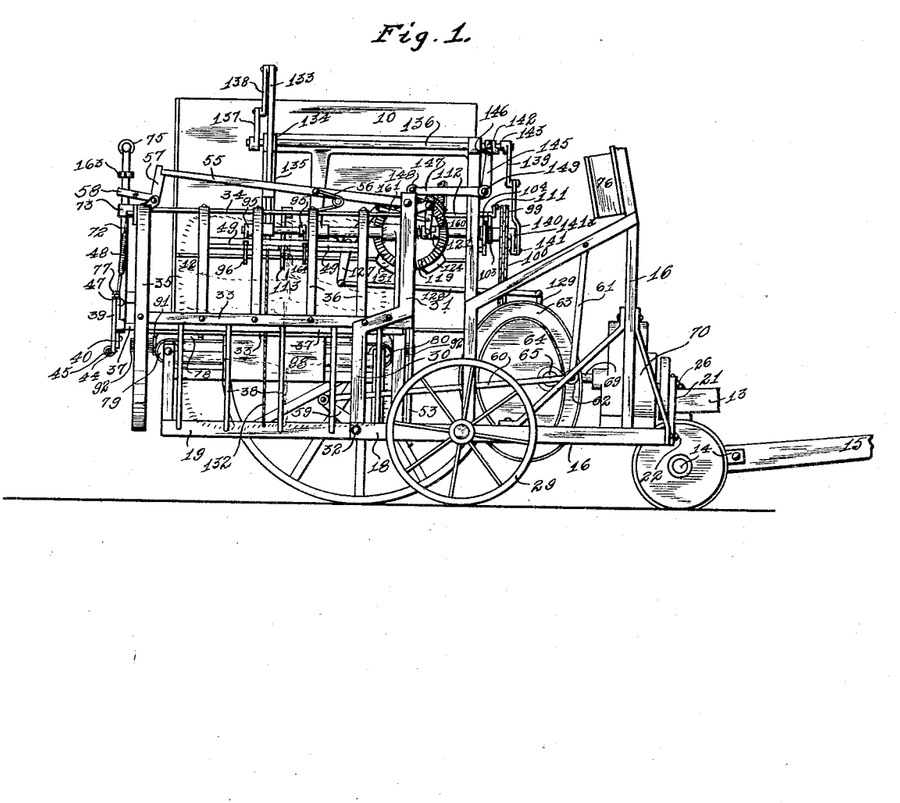
Figure 1 is a side elevation of my improved grain shocking machine as applied to a grain binder showing the former member in its normal position for receiving the bundles of the binder.
Figure 2:
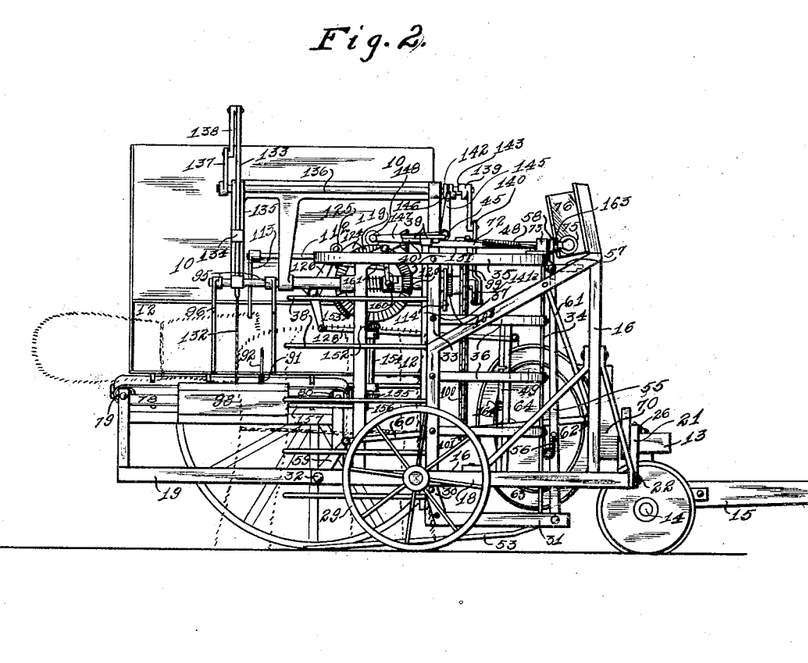
Figure 2 is a side elevation of the same with the shock former in its position for delivering the shock to the ground surface.

The outside member 33 and the member 34 are also designed to carry a series of semi-circular bars 36 which are substantially of a diameter equal to the diameter of the shock to be formed, and so arranged when the shock former frame is in the position shown in Figure 1, they form the upper portion of the shock former.

Figure 5:
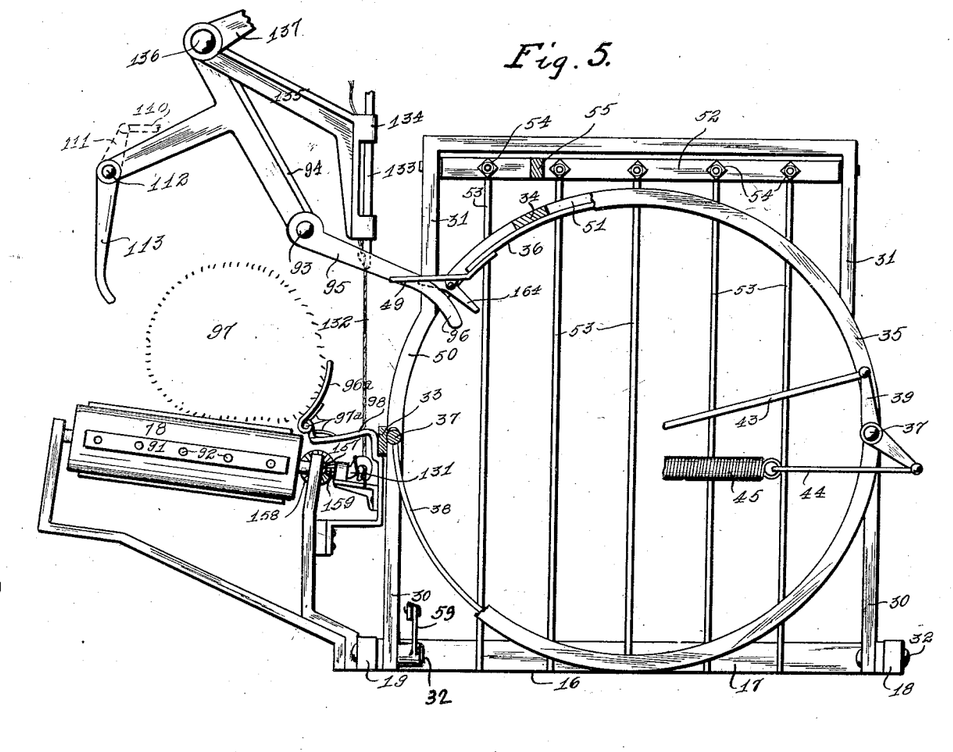
Figure 5 is an enlarged detail view of the shock former, the needle and the bundle delivering device.

The inner ends of the members 36 are secured to a plate 49 which is spaced a distance above the inner member 33 substantially equal to the diameter of a bundle of grain, as clearly shown in Figure 5. This provides an opening 50 through which a bundle of grain may enter inside of the container.

Pivotally mounted inside of each of the members 33 and parallel therewith, I have provided shafts 37. Each of these shafts 37 is provided with a series of circular tines or prongs 38 of a length substantially equal to a quarter of the circumference of the member 35, and arranged in such a manner that they form the bottom side of the shock forming member when it is in the position shown in Figure 1.

The rear end of the outer one of the shafts 37 is provided with a bell crank lever device 39, while the rear end of the inner shaft 37 is provided with a bell crank lever device 40 which includes a cam member 41 and an arm 42.

Figure 3:
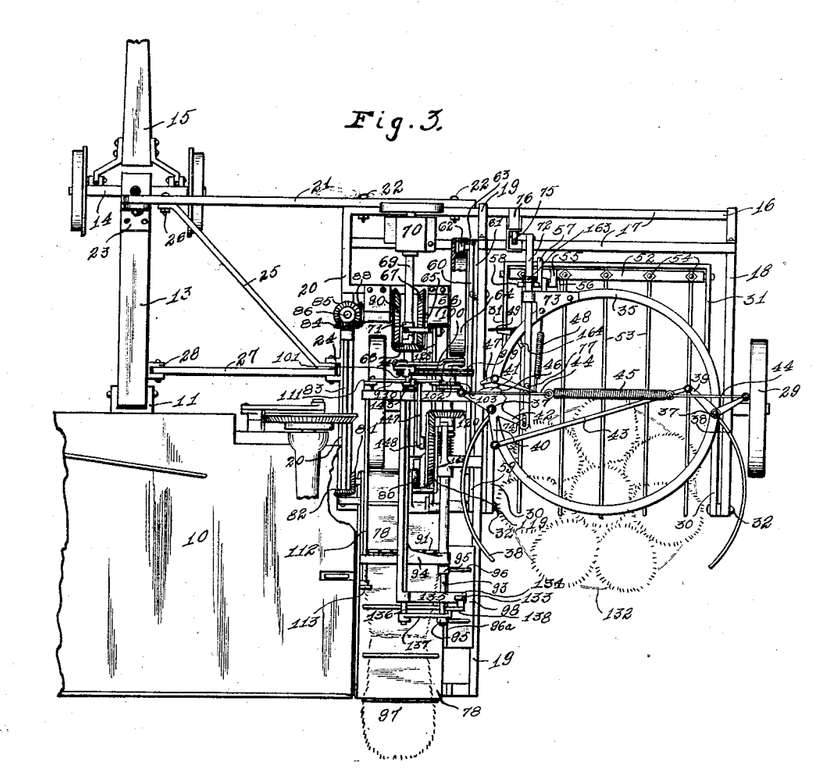
Figure 3 is a plan view of Figure 2.

One of the arms of the bell crank 40 is pivotally connected to one end of a link 43, while the opposite end of the said link is pivotally connected to the bell crank 39, as clearly shown in Figure 3. The opposite arms of the respective bell cranks are each provided with links 44, the inner ends of which are connected by means of a coil spring 45.

The link 43 and the respective arms to which it is connected are so arranged that as one of the shafts 37 is rotated or rocked in its bearing, the opposite shaft 37 will be rotated or rocked in the opposite direction, and thereby provide means whereby the tines 38 may be simultaneously operated and moved toward or from each other.

The spring 45 and the links 44 are so arranged that when the tines 38 are moved to their open position, as shown in Figure 3, the said spring will hold them in the said open position, or when the tines 38 are moved to a closed position, as shown in Figure 5, the said spring will hold them in the said closed position, which is accomplished by the well known principle of moving the supporting arms of the links 44 in such a manner that the said links 44 will pass the center of the shafts 37.

The cam plate 41 is provided with a notch 46 which is designed to receive a pawl 47 pivotally mounted on the frame member 35, this pawl being provided with an arm to which a spring 48 is attached, which is for the purpose of moving the pawl to engagement with the notch 46 when the tines 38 are in their closed position, this forms means for locking the said tines in their closed position.

The upper ends of the members 31 are provided with a pivotally mounted bar 52 which is provided with a series of downwardly extending tines 53 which are secured in position by means of bolts 54. These tines are of a length substantially equal to the diameter of the member 35 and serve to form a bottom for the shock former when the bundles are in a vertical position, as shown in Figure 2.

The member 52 is provided with a rearwardly extending arm 55 which is for the purpose of rocking the said bar 52 and for raising and lowering the free ends of the rods 53 when the said rods are in a horizontal position.

The arm 55 is provided with a spring 56, one end of which is connected to the member 34 in such a manner that the rear end of the member 55 will be held to its upper limit of movement, and the rear ends of the tines 53 held rearwardly.

The upper end of the member 55 is designed to engage a pawl 57 pivoted to the rear end of the member 34 in such a manner that the free end of the tines 53 will be locked against downward movement when the said tines are in a horizontal position.

The pawl 57 is provided with an arm 58 by which the said pawl may be made to disengage the member 55, the operation of which will hereinafter be described.

For moving the shock former from a horizontal position to a vertical position, I have provided a rock arm 59 on the inner pivot member 32. This arm extends upwardly and rearwardly when the shock former is in its horizontal position.

The upper end of the arm 59 is provided with a link 60 which extends forwardly and is pivotally connected to the lower end of a swinging link 61, the upper end of the said link being pivoted to a portion of the main frame 16.

The pivot member of the links 60 and 61 is provided with a roller 62, which is designed to travel in a cam groove 63 of a cam 64. This cam 64 is mounted on a shaft 65 mounted in a bearing 66 of the main frame. This shaft 65 is designed to carry a beveled gear 67 which is in mesh with a pinion 68 loosely mounted on an engine shaft 69, which is driven by a gasoline engine 70 of the ordinary construction.

The shaft 69 is provided with a splined clutch member 71 so arranged that the pinion 68 may be thrown into and out of operative relation with the shaft 69, as will hereinafter be described. This provides means whereby when the clutch 71 has engaged the clutch member of the pinion 68, the shock former will be moved from a horizontal position to a vertical position and returned by the rotation of the cam 68 through a complete revolution.

For moving the tines 38 from a closed to an open position or vice versa, I have provided a slide bar 72, slidably mounted in a bearing member 73 secured to the circular member 35. The lower end of the slide bar 72 is provided with a slot 74 which is for the purpose of receiving a pin 74ª from the end of the arm 42.

The upper end of the member 72 is provided with a roller 75 so arranged that it will enter the groove of a cam device 76 mounted on the upper end of the vertical and forward portion of the frame 16, the said cam 76 being so arranged that as the frame 35 is moved from the position shown in Figure 1 to the position shown in Figure 2, the roller 75 will enter the groove of the cam 76 just before the shock former has reached its vertical position, the groove of the said cam being arranged at an inclined position in such a manner that a rearward movement will be imparted to the bar 72, which will cause the end of the arm 42 to be moved rearwardly and the tines 38 moved to an open position, as shown in Figure 3.

A reverse movement of the shock former will cause the arm 42 to be moved forwardly and the tines 38 closed, the spring 45 causing the tines 38 to move quickly to an open or closed position after the links 44 have passed the center of the shaft 37. This provides means for dumping the shock, as will hereinafter be described.

The pawl 47 is released from the notch 46 by means of a pin 77 extending rearwardly on the member 72 and engaging the upper side of the pivoted arm of the pawl 47 as the said member 72 is moved to position to open the tines 38.

The slot in the member 42 provides means whereby the member 72 may move a slight distance relative to the pin within the slot, so that the pawl 47 may be made to disengage the notch 46 before the arm 42 is moved to open the tines 38.

Mounted upon the members 19 and 20, I have provided a conveyor 78 mounted on rollers 79 and 80. Each of the said rollers are mounted in suitable bearings and the roller 80 is provided with a beveled gear 81 which is in mesh with a beveled gear 82 mounted on a shaft 83. This shaft is mounted in suitable bearings supported above the member 20 and provided at its forward end with a beveled gear 84 which is in mesh with a beveled gear 85 on the upper end of a vertically arranged shaft 86, best shown in Figure 4.

The lower end of the shaft 86 is provided with a beveled gear 87 which is in mesh with a beveled gear 88 mounted on a horizontally arranged shaft 89. This shaft 89 is provided at its inner end with a beveled gear 90 which is in mesh with a beveled pinion 68 before described.

By this arrangement, it will be seen that means is provided for driving the conveyor 78 in such a manner that its top run will be rotated rearwardly, by throwing the clutch member 71 into engagement with the pinion 68.

The conveyor 78 is mounted in such a manner that its upper run is substantially in line with the floor of the chute 12, and is also in line with the inner shaft 37, as clearly shown in Figure 5, and also in line with the bottom edge of the opening 50 of the shock former.

By this arrangement, it will be seen that a bundle may be moved from the chute 12 into the said former.

It will be noted that in the above description of the mechanism for driving the conveyor 78 that the said conveyor will be operated every time the former is moved from a receiving position to a delivery position, and is thrown into operation by the clutch 71.

By this arrangement, I have provided means whereby an extra bundle may be moved endways and delivered to the ground by the operation of the conveyor 78. This conveyor is provided with two bars 91, each of which is provided with a series of teeth 92. The bars 91 are so arranged that when the conveyor 78 is in its normal position, one of the bars will be at the forward end of the conveyor and the opposite one at the rear end so that as the conveyor is started to rotate, the teeth on the front end of the conveyor will engage the butts of the bundles and move the same longitudinally with the said conveyor.

For moving the bundles from the chute 12 into the former, I have provided a shaft 93 above the outer edge of the conveyor 78 a sufficient distance to permit the bundle to pass under. This shaft 93 is rotatively mounted in bearing members 94 which are a part of the main frame construction. The said shaft 93 is provided with arms 95 which extend outwardly and have their lower ends provided with rearwardly extending and curved portions 96.

Pivotally secured adjacent to the inner edge of the conveyor 78, I have provided a plate 96ᵃ for the purpose of preventing the bundle 97 from being discharged into the opening 50 by the action of the binder mechanism, or from rolling off the conveyor 78 by gravity. This member 96ᵃ is provided with a spring hinge 97ᵃ for yieldingly holding the member 96ᵃ in its elevated position, shown in Figure 5.

Thus it will be seen that as the shaft is rotated in an anti-clockwise direction, as shown in Figure 5, a bundle 97 will be engaged by the said arms 95 and thrown into the opening 50 above a plate 98 which extends between the lower edge of the opening 50 and the inner edge of the conveyor 78.

The inward movement of the bundle 97 will cause the plate 96ᵃ to move downwardly adjacent to the plate 98 against the action of the spring hinge 97ᵃ. This plate will again assume a vertical position the moment the bundle has been delivered.

For rotating the shaft 93, I have provided a shaft 93ᵃ in line with and adjacent to the front end of the shaft 93 mounted in suitable bearings. The forward end of this shaft 93ᵃ is loosely mounted in a sprocket wheel 99 at its forward end which is designed to receive a chain 100, the said chain 100 being operated by means of a sprocket 101 mounted on the shaft 69, best shown in Figure 6.

The sprocket 99 is provided with a sleeve 102. The sleeve 102 is designed to carry a ratchet wheel 103.

Fixed to the shaft 93ᵃ, I have provided a disc 104 on which is pivotally mounted a rachet catch 105, said catch 105 being provided with a radially extending arm 106 to which a spring 107 is connected, one end of which is secured to the disc 104. This spring 107 is for the purpose of causing the catch 105 to yieldingly engage the rachet teeth 103.

The member 106 is designed to engage a stop member 108 which has the form of a bell crank lever and is pivotally mounted on the shaft 109. The upwardly extending arm of the bell crank 108 is provided with a link 110 extending horizontally and transversely across the frame and is pivoted to an arm 111 mounted upon a shaft 112. This shaft is pivotally mounted in the frame and is provided with a downwardly extending trip arm 113 so placed as to lie in the path of the bundles as they are discharged from the chute 12 by means of the regular kick-off devices.

By this arrangement, it will be seen that as a bundle is thrown under the arm 113, the shaft 112 will be rocked, and the stop 108 moved out of engagement with the member 106. The spring 107 will move the catch 105 into engagement with the teeth 103 which in turn will cause the disc 104 to be rotated. This will cause the shaft 93ᵃ to be rotated.

The inner end of the shaft 93ᵃ is provided with a pinion gear 120 which is fixed thereto, the said pinion 120 being provided with a clutch member 121. The adjacent end of the shaft 93 is provided with a splined clutch member 122 which is designed to co-act with the clutch member 121, and is yieldingly held in operative relation to said clutch by means of a spring 123.

By this arrangement it will be seen that as the shaft 93ᵃ is rotated, the shaft 93 will be rotated when the said clutches are in engagement. This in turn will cause the arms 95 to be rotated which will cause the bundles on the conveyor 74 to discharge through the opening 50 of the shock former.

When the disc 104 has made one revolution, the arm 106 will engage the stop 108.

This will cause the catch 105 to disengage the teeth 103. The disc 104 will be held against rearward movement due to the action of the spring 107 by means of a pawl 114 which is designed to enter the notch 115 in the periphery of the said disc.

The arm 113 is moved to its normal position of movement by means of a spring 116, the said movement being limited by means of the arm 111 engaging the pin 117.

Thus it will be seen that the arms 95 will be made to rotate through an entire revolution each time a bundle is discharged onto the conveyor 78.

Figure 6:
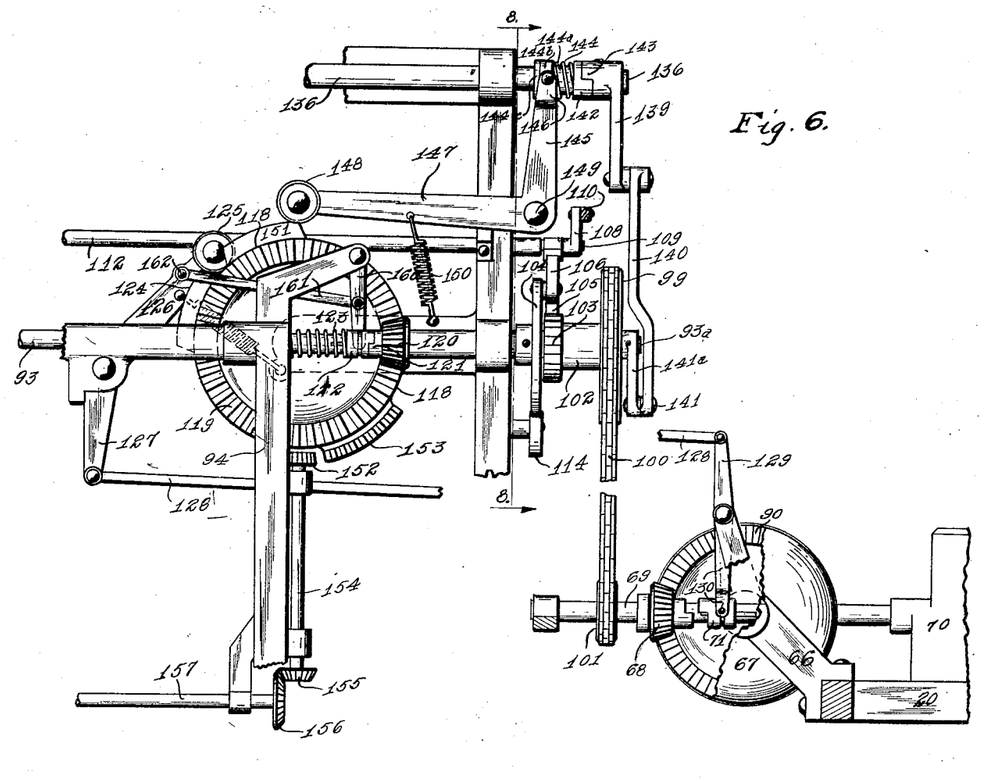
Figure 6 is an enlarged detail view of a portion of the controlling and operating mechanism.
Figure 7:
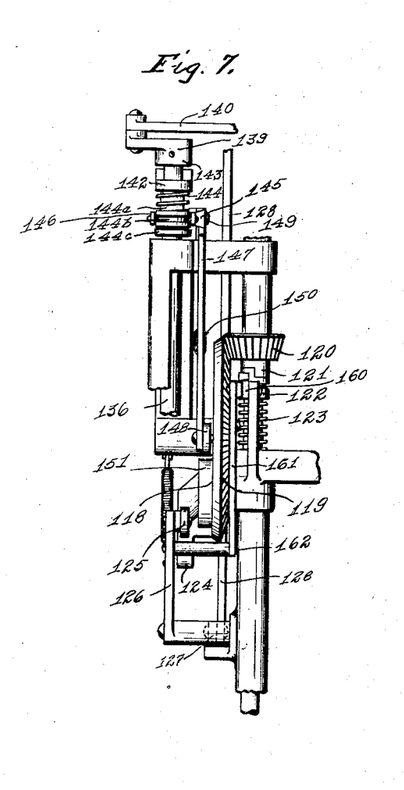
Figure 7 is a plan view of a portion of the mechanism shown in Figure 6.
Figure 8:
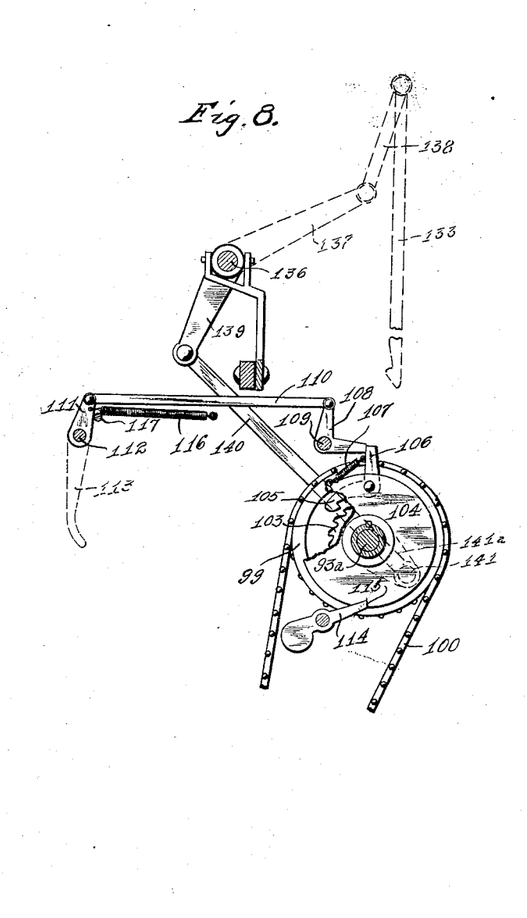
Figure 8 is a detail view of the needle controlling mechanism taken on the line 8—8 of Figure 6.

For timing the various mechanisms and throwing them into operation, I have provided a cam gear 118 which is pivotally mounted adjacent to the shaft 93, and is designed to carry a beveled gear 119 which is in mesh with the pinion 120, shown in Figure 6.

It is my intention to make the shock former hold eight bundles. However, the shock former may be made to hold as many bundles as desired. In this particular case the gear 119 is nine times the diameter of the pinion 120 so that as the said pinion is rotated nine times or after eight bundles have been discharged into the shock former and one discharged onto the conveyor 74, the cam plate 118 will rotate one revolution.

By this arrangement, it will be seen that the tilting of the shock former will be accomplished once every time the disc 118 makes one revolution. This is done through the following mechanism:

Mounted on the peripheral edge of the member 18, I have provided a cam 124. This cam is designed to engage a roller 125 mounted on the end of a rock arm 126 which is pivoted to the main frame.

This arm 126 is provided with a downwardly extending portion 127, the lower end of which is pivoted to one end of a link 128. The forward end of the link 128 is pivoted to a pivoted arm 129, the lower end of which is provided with a fork 130 designed to operatively engage the clutch member 71, before described, on the shaft 69.

By this arrangement, it will be seen that as the member 118 is rotated in a clockwise direction, the cam 124 will engage the roller 125 and cause the rod 128 to be moved to the right, as shown in Figure 6, and the lower end of the lever 129 to be moved to the left in engagement with the clutch member of the pinion 68, thereby throwing the gears 67 and 90 into operation and the gear 67 causing the former to be moved to its vertical position and back, while the gear 90 will cause the conveyor 78 to be moved and the bundle thereon discharged.

After eight bundles have been discharged into the shock former, it is necessary to provide means for placing the tie or string around the shock within the former. To accomplish this, I have provided a knotter mechanism and twine holder generally indicated by the numeral 131, which is mounted beneath the plate 98, and is of the construction similar to those used in the ordinary binders, and for that reason the details of this mechanism have not been illustrated in the drawings.

The twine 132 has one end secured in the clamp mechanism of the device 131 and the other end extending upwardly in front of the opening 50 to a needle 133. This needle is vertically arranged and in the form of a straight bar, and slidably mounted in bearings 134 supported from the bracket 135 of the main frame. The construction of this needle is similar to those used in the ordinary grain binders with the exception that it is straight instead of curved. The twine 132 is fed through the needle and extends through the ordinary tension device and twine box, not shown in the drawings.

After the shock former has been emptied and returned to its normal position, the string assumes the position shown in Figure 5.

Figure 4:
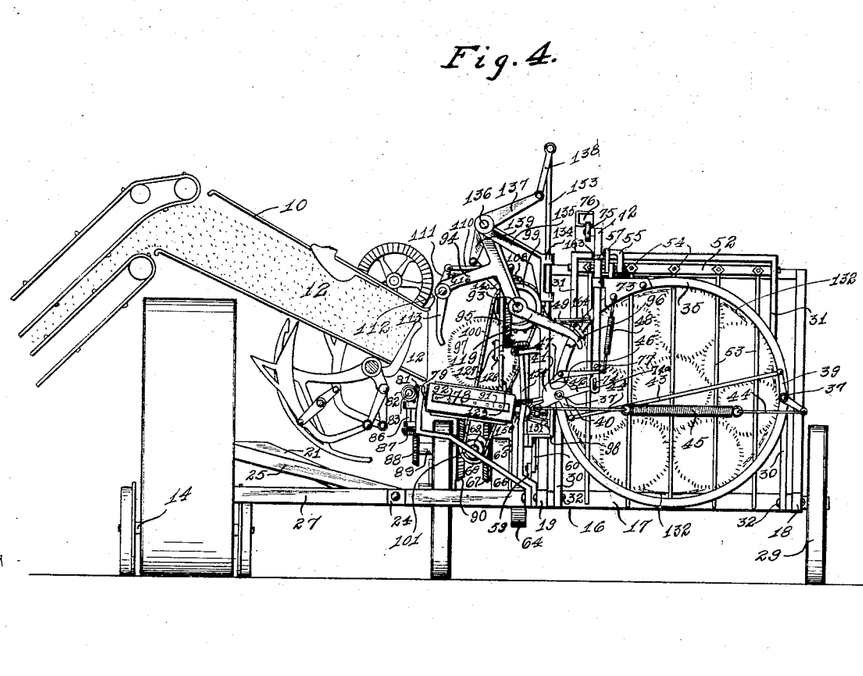
Figure 4 is a rear end elevation of Figure 1.

It will be seen that as the bundles are discharged through the opening 50, they will engage the twine 132 and carry it through the said opening 50, and it will surround all of the bundles as they are discharged into the said former. After the eight bundles have been discharged into the former, the needle is operated through the following mechanism:

Secured in the brackets 35 is a shaft 136, one end of which is provided with an upwardly extending rock arm 137, shown in Figure 4. The free end of the said arm is provided with a link 138 which is pivotally connected to the upper end of the needle 133. The opposite end of the shaft 136 is provided with a rotatively mounted arm 139, shown in Figure 6, the free end of which is pivoted to one end of a link 140. The opposite end of the link 140 is connected to a pin 141 of a crank 141$^a$ secured to the outer end of the shaft 93$^a$, and so arranged that every time the shaft 93$^a$ makes one revolution, the arm 139 will oscillate through an arc of a circle.

Splined to the shaft between the member 139 and the bearing member 135, I have provided a clutch member 142 which is designed to engage a clutch member 143 of the arm 139. This clutch is yieldingly held into engagement by means of a spring 144. The said spring 144 is mounted on the sleeve 144$^a$ and designed to be engaged by means of a collar 144$^b$. It is normally held out of engagement by means of a lever 145 having a fork portion 146 pivotally connected to the collar 144$^b$ to engage a collar 144$^c$ of the sleeve 144$^a$.

The lever 145 is provided with a right angularly extending portion 147 having a roller 148. The said levers 147 and 145 are mounted on the frame by means of a pivot 149. The lever 147 is yieldingly held in its normal position of movement by means of a spring 150 with the roller 148 adjacent to the periphery of the cam gear 118.

Just after the eighth bundle has entered the opening 50 of the shock former, the roller 148 will be engaged by the cam 151 and the clutch 142 thrown into engagement with the clutch 143 just as the cam 118 stops.

Thus it will be seen that as the ninth bundle is moved into position on the conveyor 78 and the lever 113 is tripped the cam 118 will be started into motion, and also that the arm 139 and the needle 133 will be moved downwardly in front of the opening 50 and carry the string to the knotter device 131 where a knot will be tied and the string severed.

The knotter device 131 is operated by means of a pinion 152 engaging a cam gear 153 of the member 118. The pinion 152 drives a vertically arranged shaft 154 which in turn drives beveled gears 155 and 156, thence a shaft 157 on which a beveled gear 158 is mounted, and which is in mesh with a beveled gear 159 of the knotter member.

As the gear 118 continues to rotate, the cam 124 will engage the roller 125, thereby throwing the clutch member 71 into engagement with the clutch member 68, as before described.

As the arm 126 is moved outwardly by the action of the cam 124, the clutch member 122 will be moved out of engagement with the clutch 121 by means of an arm 160 which has one end pivotally connected to the main frame, while the other end is connected to the said clutch 122.

This arm 160 is provided with a link 161 which is connected to a pin 162 mounted in the lever 126.

When the clutch member 122 has disengaged the clutch 121, the shaft 93 will be thrown out of operative relation with the shaft 93ª, and thereby the arms 95 will be inoperative so that the ninth bundle will not be delivered into the shock former, but it will be delivered rearwardly to the ground surface by the conveyor 78 being operated, as before described.

The cam 64 is so shaped that as the needle 133 is moved downwardly, the shock former will be inoperative until the said needle has reached its downward limit of movement and the knot has been tied. The rear end of the shock former will then start to elevate which will cause the tied loop of the twine to be pulled from the knotter as the shock is moved to its vertical position.

As the shock is being moved to its vertical position and has reached the point where the tines 53 are nearly horizontal with the ground surface, the roller 75 will enter the groove of the member 76. This will cause a rearward movement of the rod 72, as before described. As the said rod moves rearwardly, a collar 163 will engage the member 58, which will cause the member 57 to disengage the member 55. This will permit the rear end of the tines 53 to move downwardly and the butts of the shock to engage the ground surface, after which the said tines will be pulled out by the forward advance of the machine.

In this connection, it will be noted that the rear ends of the tines will move rearwardly as the shock is being moved to its vertical position so that the butts of the shock will be traveling rearwardly relative to the frame of the machine at a speed substantially equal to the advance of the machine, which would cause the shock to follow vertically downwardly as the butts of the said shock engage the ground surface.

By this arrangement, a shock may be set squarely on the ground surface without any tendency to upset the shock due to the momentum of the same, if the shock does not move rearwardly relative to the frame of the machine as it is permitted to engage the ground surface.

Thus it will be seen that I have provided a mechanism in the nature of an attachment which may be applied to any of the regular grain binders in such a manner that the bundles delivered by the binder may be received upon the conveyor member 78, and thence delivered to the member 38 of the bundle forming mechanism in such a manner that the bundles rest in a horizontal position.

The first bundle delivered will slide to the central portion of the said former by gravity. The second bundle will move on the top of the first and the third bundle will be thrown in over the top of the other two, and the rest of the eight bundles will be crowded into the container by means of the arms 95. The last bundle will be held against outward movement by means of a pivoted dog 164 secured to the plate 149.

By forming the shock in a horizontal position, the bundles may be easily carried in the said position until the shock has been entirely formed, after which the ends of the twine are tied then the shock is moved to a vertical position, after which the outer ends of the rods 53 are lowered and the members 38 are moved to an open position.

The string holds the bundles together so that the shock, when delivered to the ground surface, will remain in a standing position and all of the bundles of the shock will be in substantially a vertical position, which is a very important feature in erecting shocks. If the bundles are not arranged parallel with each other and then tied in that position before the shock is placed on the ground surface, the bundles of the shock will have a tendency to lean in one direction, which will cause the whole shock to become twisted and to fall down. This is one of the difficult experiences in attempting to form shocks mechanically in which the bundles are placed in the shock forming mechanism in a vertical position.

Another advantage of my device lies in the fact that an extra bundle can be delivered to the ground surface adjacent to the shock and can be used for a cap.

Another advantage lies in the fact that the bundles delivered from the binder come in a very rapid succession when the binder is operating in heavy grain. In fact, the movement is almost continuous. Great difficulty has been experienced in machines which move each individual bundle from a horizontal position to a vertical position while the shock is being formed, due to the fact that the mechanism to set the bundles up does not have time to return before the next bundle is in position.

This difficulty I have overcome with my arrangement, due to the fact that the bundles may be fed to the former as rapidly as they come from the binder, and when it becomes necessary to set them up, the extra bundle does not enter the former, but is delivered to the ground surface. The time in which this bundle is being delivered makes it possible for the shock former to be moved to its vertical position and returned before another bundle is delivered to it. This makes it possible to use the shocking mechanism on the large size binders which are becoming very popular at the present time where an eight foot sickle or mower is employed.

Another important feature of my improved mechanism lies in the fact that the arms 38 are rapidly swung to an open or closed position by means of the spring control mechanism 45. This permits the arms 38 to be very quickly thrown to an open position when it is desired to discharge the shock so that the sides of the shock are in engagement with the arms and thereby being pulled down. The arms 38 will also be thrown rapidly to a closed position so they will not engage the ground surface as the shock former is being returned to the normal position.

Another advantage of my device lies in the fact that all of the mechanisms are driven by means of a motor so that the various operations of the shock former will be quickly accomplished after it has been tripped by the trip arm.

I claim as my invention:

1. In combination, a grain binder having a delivery chute and a pivoted tongue member with a grain shocking mechanism designed to receive bundles of grain from the chute of said binder, and to form them into a shock and deliver the shock to the ground, the said shocking mechanism being provided with a frame pivotally mounted on supporting wheels, said frame being provided with a laterally extending rigid member pivotally connected to the forward end of the pivoted tongue of said binder, and a pivoted laterally extending link substantially parallel with the first said rigid member, and pivotally connected to the rear end of said pivoted tongue.

2. In combination, a grain binder having a delivery chute and a pivoted tongue member with a grain shocking mechanism designed to receive bundles of grain from the chute of said binder, and to form them into a shock and deliver the shock to the ground, the said shocking mechanism being provided with a frame pivotally mounted on supporting wheels, said frame being provided with a laterally extending rigid member pivotally connected to the forward end of the pivoted tongue of said binder, and a pivoted laterally extending link substantially parallel with the first said rigid member, and pivotally connected to the rear end of said pivoted tongue, a brace bar arranged diagonally between said parallel member having one end fixed near the pivoted end of said rigid bar and its other end pivotally connected with the pivot of the inner end of said pivoted link.

3. In combination, a grain binder having a delivery chute having means for discharging bound bundles, a wheel supported frame, means for detachably connecting the frame to said binder, means for receiving the discharged bundles from said binder, a shock forming mechanism, means for moving a predetermined number of bundles to the said shock former, means for delivering said shock to the ground after it has been formed, means for delivering an extra bundle to the ground adjacent to said shock, and means for driving all of said means.

4. In combination with a binder having a discharge chute having means for discharging bound bundles to a grain shocker comprising a wheel supported frame, means for attaching said frame to said binder, means on said frame for receiving the discharged bundles from the chute of said binder, a bundle former designed to receive bundles in a horizontal position, means for moving the bundles from said receiving mechanism to said former, means for tying twine around the shock within said former, means for moving the former from a horizontal position to a vertical position, means for discharging the shock from said former to the ground surface in an upright position, and means for discharging an extra bundle from said receiving mechanism to the ground surface as the shock former is being moved from its horizontal position to its vertical position, and a motor for actuating all of said means.

5. In combination with a binder having a discharging chute having means for discharging bound bundles, with a grain shocker comprising a wheel supported frame, means for attaching said frame to said binder, a movable platform on said frame for receiving the bundles from said binder, a pivoted and cylindrical shock forming and receiving mechanism designed to receive bundles from said movable platform in a horizontal position, means for tying a twine around said shock after it has been formed, means for moving the shock former from a horizontal position to a vertical position, the said shock former being so arranged that the butts of the bundles will move rearwardly at a speed substantially equal to the advance speed of the shocking mechanism as the shock assumes a vertical position, means for discharging said shock to the ground surface in an upright position and while the butts of said shock are being moved rearwardly, means for moving the said movable platform to discharge an additional bundle which is received on the said platform as the tying mechanism of the shocker is being operated to discharge the said bundle as the shock former is being moved from a horizontal position to a vertical position, and a motor for driving all of said means.

6. A shocker attachment for binders comprising a wheel supported frame, a bundle receiving mechanism, a shock forming mechanism, means for moving bundles from the receiving mechanism to the forming mechanism, means for discharging the shock from said forming mechanism to the ground surface in an upright position, and means for discharging an extra bundle to the ground adjacent to the shock while the said shock is being discharged, and means for driving all of said mechanisms.

7. A grain shocking mechanism comprising a wheel supported frame, a movable platform for successively receiving bundles from a binder, a shock forming mechanism, means for moving the bundles laterally in said shock forming mechanism from said movable platform, means for discharging the bundles from said shock forming mechanism, and means for moving said movable platform to move a bundle longitudinally to discharge it to the ground surface adjacent to the shock as the said shock is being discharged, and means for driving said mechanism.

8. A shocking mechanism attachment for grain binders comprising a wheel supported frame, a prime mover on said frame, controlling mechanism continuously driven by said prime mover, a movable platform for successively receiving bundles, a shock forming mechanism to receive bundles from said platform, means for discharging bundles from said platform to said shock former, and means for discharging the shock from said former to the ground surface in an upright position, means for driving said movable platform to discharge a bundle to the ground surface adjacent to said shock as the said shock is being discharged, and means controlled by the movement of a bundle on the said movable platform for throwing all of the said mechanisms in operative relation with the constantly driven mechanism of said prime mover.

9. A shocker attachment for grain binders comprising a wheel supported frame, a prime mover on said frame, mechanism constantly driven by said prime mover, a shock forming mechanism, means for successively receiving bundles from a binder and delivering them to said shock former, and means for delivering a shock from said shock former to the ground surface in an upright position, means for driving said shock forming, receiving and delivering mechanisms, means controlled by bundles moving into said bundle receiving mechanism for throwing the last said operating means into operative relation with the continuously moving mechanism of said prime mover.

10. A shocker attachment for grain binders comprising a wheel supported frame, a prime mover on said frame, a mechanism constantly driven by said prime mover, a shock forming mechanism, means for successively receiving bundles from a binder and delivering them to said shock former, means for tying the shock within said former, means for delivering a shock from said shock former to the ground surface in an upright position, means for driving said shock forming, receiving, tying and delivering mechanisms, means controlled by bundles moving into said bundle receiving mechanism for throwing the last said operating means into operative relation with the continuously moving mechanism of said prime mover.

11. A shocker attachment for binders comprising a shock forming mechanism, means for moving bundles from a binder to the said forming mechanism, means for discharging a shock from the said forming mechanism to the ground surface in an upright position, means for discharging an extra bundle to the ground adjacent to the shock while the said shock is being discharged, and means for driving all of said mechanisms.

12. A shocker attachment for grain binders comprising a wheel supported frame, a prime mover on said frame, mechanism constantly driven by said prime mover, a shock forming mechanism, means for successively receiving bundles from a binder and delivering them to said shock former, means for delivering a shock from said former to the ground surface in an upright position, means for driving said shock forming, tying and delivering mechanism, means controlled by bundles as they are delivered to said forming mechanism for throwing the last said operative means into operative relation with the continuously moving mechanism of said prime mover.

Des Moines, Iowa, July 21, 1921.

MYRON P. KING.